May 31, 1927.  
M. YAKUBOWSKI  
1,630,997  
PLOW SUPPORT  
Filed Dec. 24, 1925
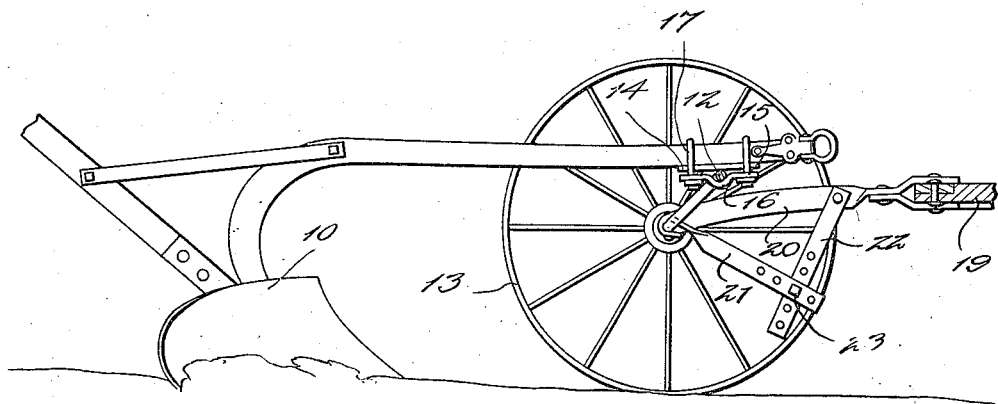
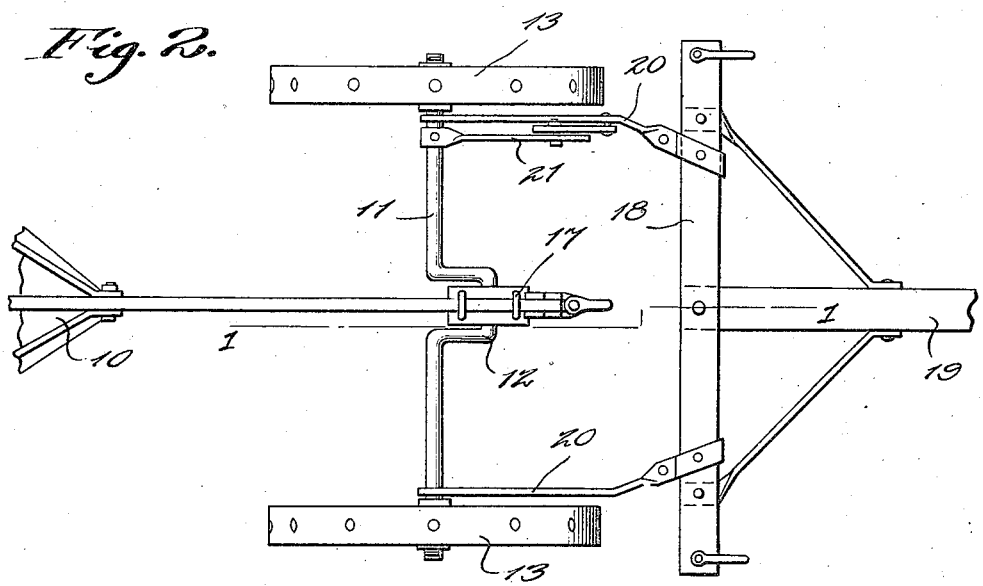
INVENTOR  
Maryan Yakubowski  
BY Victor J. Evans  
ATTORNEY
WITNESSES:  
R. E. Wise.

Patented May 31, 1927.

1,630,997

UNITED STATES PATENT OFFICE.

MARYAN YAKUBOWSKI, OF WHITE HAVEN, PENNSYLVANIA.

PLOW SUPPORT.

Application filed December 24, 1925. Serial No. 77,510.

This invention relates to improvements in supporting means for use upon agricultural plows and which contemplates a provision of a shaft having a yoke formed at an intermediate point in its length for attaching the forward end of a plow beam thereto and wheels journaled upon its opposite ends to permit the plow to be towed by a whiffletree and tongue associated therewith.

Another object of my invention residing in the provision of a bar fixed to the shaft and associated with the connecting means is a draft bar whereby the yoke portion of the shaft may be regulated with respect to its height whereby a plow share may be dipped to a desired depth within the soil.

With the above and other objects in view, the invention further includes the following novel features and details of construction, to be hereinafter more fully described, illustrated in the accompanying drawings and pointed out in the appended claims.

In the drawing:—

Figure 1 is a longitudinal sectional view taken on line 1—1 of Figure 2.

Figure 2 is a top plan view of my invention.

Referring to the drawing in detail, wherein like characters of reference denote corresponding parts, the reference character 10 indicates a plow which is of the usual and well known construction and forms no part of the present application for Letters Patent but is merely shown for purposes of illustration in bringing forward the novel advantages of the above entitled invention.

The invention resides in the provision of a shaft 11 forming a yoke 12 at an intermediate point in its length while wheels 13 are journaled upon its opposite ends. The plow beam has a plate 14 arranged upon its under side and adjacent its forward end and an additional plate 15 arranged upon its under side and forming a transversely disposed depressed portion 16 at an intermediate point in its length for the reception of the yoked portion 12 of the shaft 11 therein while U-bolts 17 mounted upon the plow beam having their opposite ends secured to the respective plates 14 and 15 in order that the plow beam may be secured upon the shaft 11.

A draft bar 18 has a tongue 19 extending therefrom including rearwardly extending arms 20 thereon and having their free ends received upon the shaft 11 adjacent the wheels 13, as clearly illustrated in Figure 2 of the drawing.

When the user or operator of the above entitled invention is desirous of raising and lowering the plow beam to regulate the pitch of the plow with respect to the depth at which the soil is to be plowed I provide a plate 21 having one end rigidly secured to the shaft 11 and extending downwardly and forwardly thereof while an additional plate 22 is secured to one of the arms 20 and downwardly therefrom in juxtaposition with respect to the plate 21 in order that fastening elements such as indicated at 23 may be inserted within any one of the plurality of registering openings provided in such plates 21 and 22 whereby the height of the yoke portion 12 of the shaft 11 may be rigidly held in a desired position.

It is further to be noted that if by chance the plow share should meet obstructions removed within the soil that the same may be readily backed up without injuring the plow share or loosening its connection or association with the shaft 11.

The invention is susceptible of various changes in its form, proportions and minor details of construction, and the right is herein reserved to make such changes as properly fall within the scope of the appended claims.

Having thus described the invention, what is claimed is:—

1. A support for use upon agricultural plows comprising a shaft forming a yoke at an intermediate point in its length and including wheels journaled upon its opposite ends, a plow beam supported by said yoke, a draft bar and tongue secured thereto, members connecting said draft bar with said shaft, an apertured plate secured to one of the members and extending rearwardly and downwardly therefrom, and a correspondingly shaped plate fixed upon the shaft and extending in an opposite direction in juxtaposition with respect to the first mentioned apertured plate and adapted to receive a fastening element within its apertures registering with the apertures of the first mentioned plate for regulating the height and throw of the yoke and incidentally the inclination and pitch of the plow share.

2. A support for use upon agricultural plows comprising a shaft forming a yoke at an intermediate point in its length, wheels journaled upon its opposite ends, a draft bar and tongue therefor being connected with the shaft, a plate fixed upon the shaft, and an additional plate also carried by the connecting means for the draft bar and shaft and connected with the fixed plate for regulating the throw and height of the yoke incident to the pitch of the plow share.

In testimony whereof I affix my signature.

MARYAN YAKUBOWSKI.